United States Patent
Mason et al.

(10) Patent No.: US 10,364,831 B2
(45) Date of Patent: Jul. 30, 2019

(54) METHOD AND SYSTEM FOR AIR MANAGEMENT OF AIRCRAFT SYSTEMS

(71) Applicant: General Electric Company, Schenectady, NY (US)

(72) Inventors: Jeffrey Lee Mason, Sharonville, OH (US); Ronald Bruce Schofield, Clarksville, OH (US); Seth Michael Ray, Wyoming, OH (US); Benjamin James Schumacher, Cincinnati, OH (US); James Fitzgerald Bonar, Cincinnati, OH (US); George Elliott Moore, Lebanon, OH (US)

(73) Assignee: General Electric Company, Schenectady, NY (US)

( * ) Notice: Subject to any disclaimer, the term of this patent is extended or adjusted under 35 U.S.C. 154(b) by 718 days.

(21) Appl. No.: 14/609,964

(22) Filed: Jan. 30, 2015

(65) Prior Publication Data

US 2016/0222986 A1    Aug. 4, 2016

(51) Int. Cl.
| | |
|---|---|
| *F02C 6/08* | (2006.01) |
| *F04F 5/16* | (2006.01) |
| *B64D 13/04* | (2006.01) |
| *F02C 9/16* | (2006.01) |

(Continued)

(52) U.S. Cl.
CPC ............... *F04F 5/16* (2013.01); *B64D 13/04* (2013.01); *F02C 6/08* (2013.01); *F02C 9/16* (2013.01);
(Continued)

(58) Field of Classification Search
CPC .... F02C 6/08; F02C 9/16; F01D 11/24; F05D 2260/601; F04F 5/16; F04F 5/54;
(Continued)

(56) References Cited

U.S. PATENT DOCUMENTS

| | | |
|---|---|---|
| 3,134,338 A | 5/1964 | Dodge |
| 3,185,107 A | 5/1965 | Dodge |

(Continued)

FOREIGN PATENT DOCUMENTS

EP    3 048 310 A1    7/2016

OTHER PUBLICATIONS

A European Search Report and Opinion issued in connection with corresponding EP Application No. 16153234.6 dated Jul. 4, 2016.

(Continued)

*Primary Examiner* — Theresa Trieu
(74) *Attorney, Agent, or Firm* — Dority & Manning, P.A.

(57) ABSTRACT

A method and system for an air management system (AMS) is provided. The AMS includes a jet pump assembly including a motive air inlet, a plurality of suction inlets, and a single outlet. The AMS also includes a supply piping arrangement including a conduit configured to channel relatively higher pressure air from a compressor to the motive air inlet, a conduit configured to channel relatively higher pressure air from the compressor to at least one of the plurality of suction inlets through a shutoff valve, and a conduit configured to channel relatively lower pressure air from the compressor to at least one of the plurality of suction inlets. The AMS further includes an outlet piping arrangement configured to channel outlet air from said jet pump assembly to a distribution system. A pressure regulation strategy of the motive jet pump flow allows optimization of engine fuel burn and/or thrust, depending on which is most important to the aircraft during any flight phase.

14 Claims, 7 Drawing Sheets

(51) Int. Cl.
*F04F 5/54* (2006.01)
*F02C 6/04* (2006.01)
*F02C 9/00* (2006.01)
*B64D 13/06* (2006.01)

(52) U.S. Cl.
CPC ............... *F04F 5/54* (2013.01); *B64D 13/06* (2013.01); *Y02E 20/14* (2013.01); *Y02T 50/44* (2013.01); *Y02T 50/56* (2013.01)

(58) Field of Classification Search
CPC ......... B64D 13/04; B64D 13/06; Y02E 20/14; Y02T 50/44; Y02T 50/56
USPC .......................................... 60/782, 785, 795
See application file for complete search history.

(56) References Cited

U.S. PATENT DOCUMENTS

| | | | |
|---|---|---|---|
| 4,285,466 A | | 8/1981 | Linscheid et al. |
| 4,543,900 A | | 10/1985 | Aker |
| 4,711,084 A | | 12/1987 | Brockett |
| 5,161,364 A | * | 11/1992 | Bruun ...................... F02C 6/18 60/772 |
| 5,322,222 A | | 6/1994 | Lott |
| 5,385,012 A | * | 1/1995 | Rowe ........................ F02C 9/18 60/795 |
| 8,099,973 B2 | | 1/2012 | Sampson et al. |
| 8,465,264 B2 | * | 6/2013 | Sampson ................ F04F 5/466 417/176 |
| 2008/0115503 A1 | | 5/2008 | Vasquez et al. |
| 2010/0170574 A1 | | 7/2010 | Fauque et al. |
| 2010/0326089 A1 | | 12/2010 | Weber et al. |
| 2016/0207011 A1 | | 7/2016 | Mason et al. |

OTHER PUBLICATIONS

Office Action issued in connection with corresponding EP Application No. 16153234.6 dated Jul. 4, 2017.

* cited by examiner

METHOD AND SYSTEM FOR AIR MANAGEMENT OF AIRCRAFT SYSTEMS

BACKGROUND

The field of the disclosure relates generally to air management systems and, more particularly, to an integrated air management system having reduced weight and optimized performance.

At least some known aircraft air management systems (AMS) include supply sources for high-pressure (HP), low-pressure (LP). Typically, the HP and LP flows are supplied directly from a respective bleed port on an engine on the aircraft. Various pressure and flow requirements may not be met on some engines for all ranges of operation of the aircraft. For these cases, a mixed mode bleed may be supplied through a jet pump. The jet pump receives both HP and LP air flow, mixes the flows in selectable proportions and delivers the mixed mode bleed air to the AMS. Various pressure and flow requirements may not be met on some engines for all ranges of operation of the aircraft. Moreover, newer engines tend to have constrained space requirements that do not permit the use of standard architecture jet pump components and simply scaling the standard architecture jet pumps will not be able to mix the HP and LP flows adequately. Moreover, bleeding large quantities of highly compressed air from an engine compressor tends to reduce the efficiency and/or increase the specific fuel consumption of the engine. Such a tendency can affect the overall performance of the gas turbine engine associated with the compressor and/or the entire aircraft. In addition, the use of mixed mode jet pump operation provides air at temperatures/pressure closer to the aircraft needs, allowing for a smaller pre-cooler (heat exchanger), providing an additional weight savings for the aircraft.

BRIEF DESCRIPTION

In one embodiment, an AMS includes a jet pump assembly including a motive air inlet, a plurality of suction inlets, and a single outlet. The AMS also includes a supply piping arrangement including a conduit configured to channel relatively higher pressure air from a compressor to the motive air inlet, a conduit configured to channel relatively higher pressure air from the compressor to at least one of the plurality of suction inlets through a shutoff valve, and a conduit configured to channel relatively lower pressure air from the compressor to at least one of the plurality of suction inlets. The AMS further includes an outlet piping arrangement configured to channel outlet air from the jet pump assembly to a distribution system.

In another embodiment, a method of operating an integrated air management system (AMS) is provided. The AMS includes a supply system coupled to a compressor of a gas turbine engine and an air distribution system. The method includes generating a flow of distribution air using at least one of a flow of relatively higher pressure air and a flow of relatively lower pressure air in a jet pump assembly, channeling the flow of distribution air to the air distribution system, and controlling a relative flow of the relatively higher pressure air with respect to the flow of relatively lower pressure air to maintain an efficiency of the integrated AMS at a first efficiency level. The method further includes receiving a demand signal and controlling the relative flow of the relatively higher pressure air flow with respect to the flow of relatively lower pressure air to maintain an efficiency of the integrated AMS at a second efficiency level based on the received demand signal.

In yet another embodiment, an aircraft includes an air management system (AMS) that includes a jet pump assembly configured to operate in a plurality of selectable modes, each of the selectable modes selected using a demand signal from an engine, each of the plurality of selectable modes associated with an efficiency of operation of the AMS. The AMS also includes a an outlet piping arrangement coupled to an outlet of the jet pump assembly and an inlet piping arrangement configured to couple the jet pump assembly to a relatively higher pressure source of air and a relatively lower pressure source of air, the inlet piping arrangement including a plurality of controlled operation valves and configured to receive automatic command signals that command the operation of the plurality of controlled operation valves to align the inlet piping arrangement into the selectable modes.

DRAWINGS

These and other features, aspects, and advantages of the present disclosure will become better understood when the following detailed description is read with reference to the accompanying drawings in which like characters represent like parts throughout the drawings, wherein.

Figure 1:
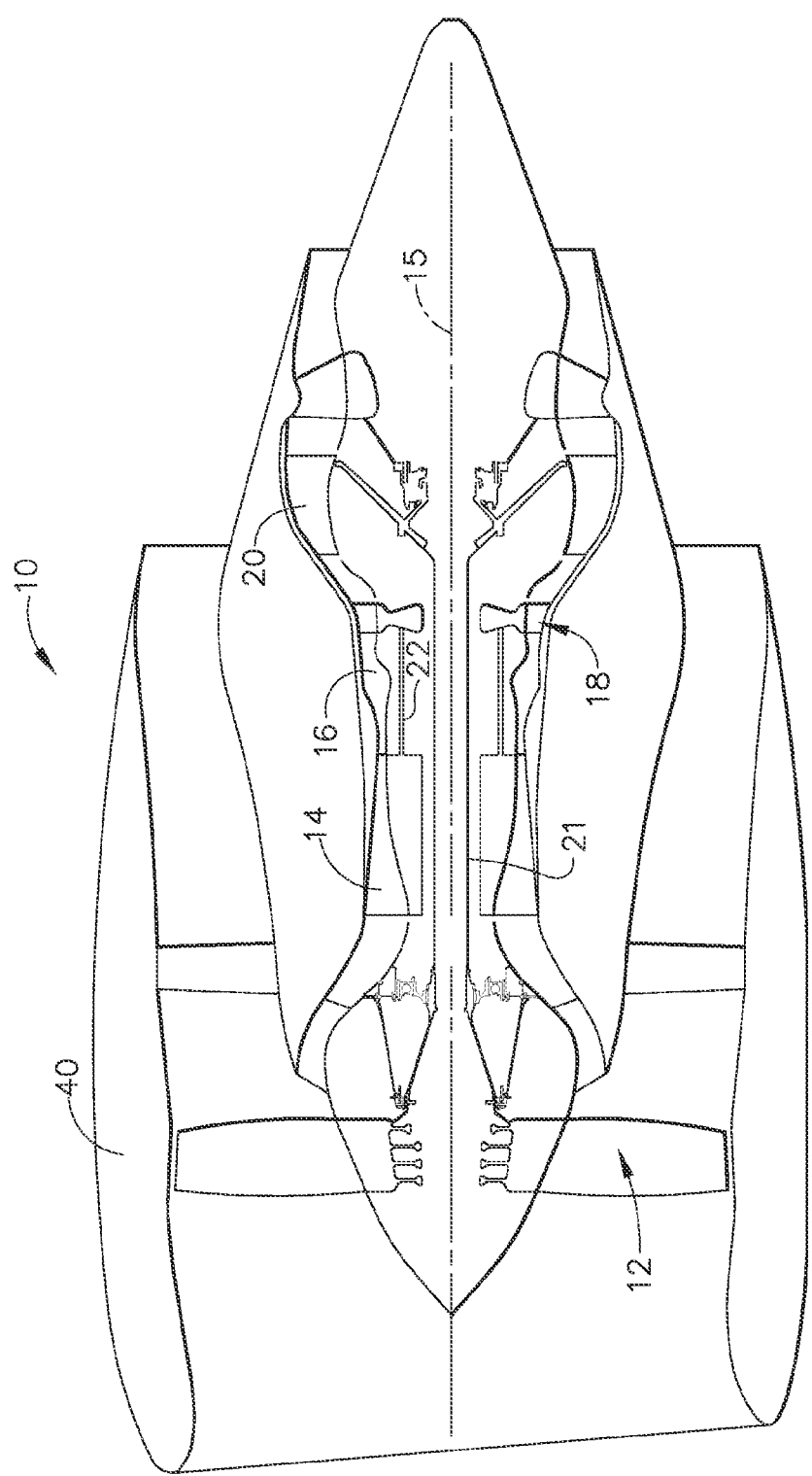
FIG. 1 is a schematic illustration of an exemplary gas turbine engine in accordance with an example embodiment of the present disclosure.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Embodiments of an Air Management System (AMS) as described herein provide air to aircraft system at various flow rates and pressures to fulfill the operational and environmental requirements of the aircraft. Such requirements define considerations of piping optimization for using a light weight and compact integrated AMS. In the example embodiment, one pump body and associated valves permits three operating modes: a) bleed air extraction from low-pressure (LP) port of a compressor only, b) bleed air extraction from a high-pressure (HP) port of the compressor only, and mixed bleed air extraction from the HP and LP ports. One set of downstream piping serves all three operating modes. The example embodiment include packaging benefits, such as, but not limited to reduced weight, smaller bi-fi, and fuel-driven valves confined to the core fire-zone. The selected compressor bleed ports are also able to be optimized for an engine efficiency improvement. The cycle efficiency penalty for aircraft bleed is minimized by designing ports on the lowest compressor stage that meets aircraft bleed requirements. Typically, the set low port is based on pressure available to the turbine at an end-of-cruise (non-icing operation). The energy requirements for icing tend to drive LP ports into higher stages of the compressor. However, mixing the HP and LP flows simulates a variable intermediate stage port, allowing a lower port to be selected for efficiency while still providing capability in icing and increasing efficiency. The example embodiment facilitates covering gaps in the temperature/pressure profile where HP air is too hot and LP pressure is too low. The example embodiment provides for power management optimization based on a component and engine efficiency improvement. The HP pressure is regulated and is variable using a Jet Pump Shut Off Valve (JPSOV) and a downstream pressure sensor feedback to provide feedback for improved jet pump efficiency at each operational point. The JPSOV regulation strategy of constant pressure output reduces the contribution of HP flow at high power. Embodiments of the present disclosure also permit higher rated thrust at the same engine turbine temperatures as traditional designs. At low power, the regulated HP/LP pressure ratio increases, which results in greater HP flow contribution. In addition, the use of mixed mode jet pump operation provides air at temperatures/pressure closer to the aircraft demand, allowing for a smaller pre-cooler (heat exchanger), providing an additional weight savings for the aircraft.

FIG. 1 is a schematic illustration of an exemplary gas turbine engine 10. Engine 10 includes a low pressure compressor 12, a high pressure compressor 14, and a combustor assembly 16. Engine 10 also includes a high pressure turbine 18, and a low pressure turbine 20 arranged in a serial, axial flow relationship. Compressor 12 and turbine 20 are coupled by a first shaft 21, and compressor 14 and turbine 18 are coupled by a second shaft 22.

During operation, air flows along a central axis 15, and compressed air is supplied to high pressure compressor 14. The highly compressed air is delivered to combustor 16. Airflow (not shown in FIG. 1) from combustor 16 drives turbines 18 and 20, and turbine 20 drives low pressure compressor 12 by way of shaft 21. Gas turbine engine 10 also includes a fan containment case 40.

Figure 2:
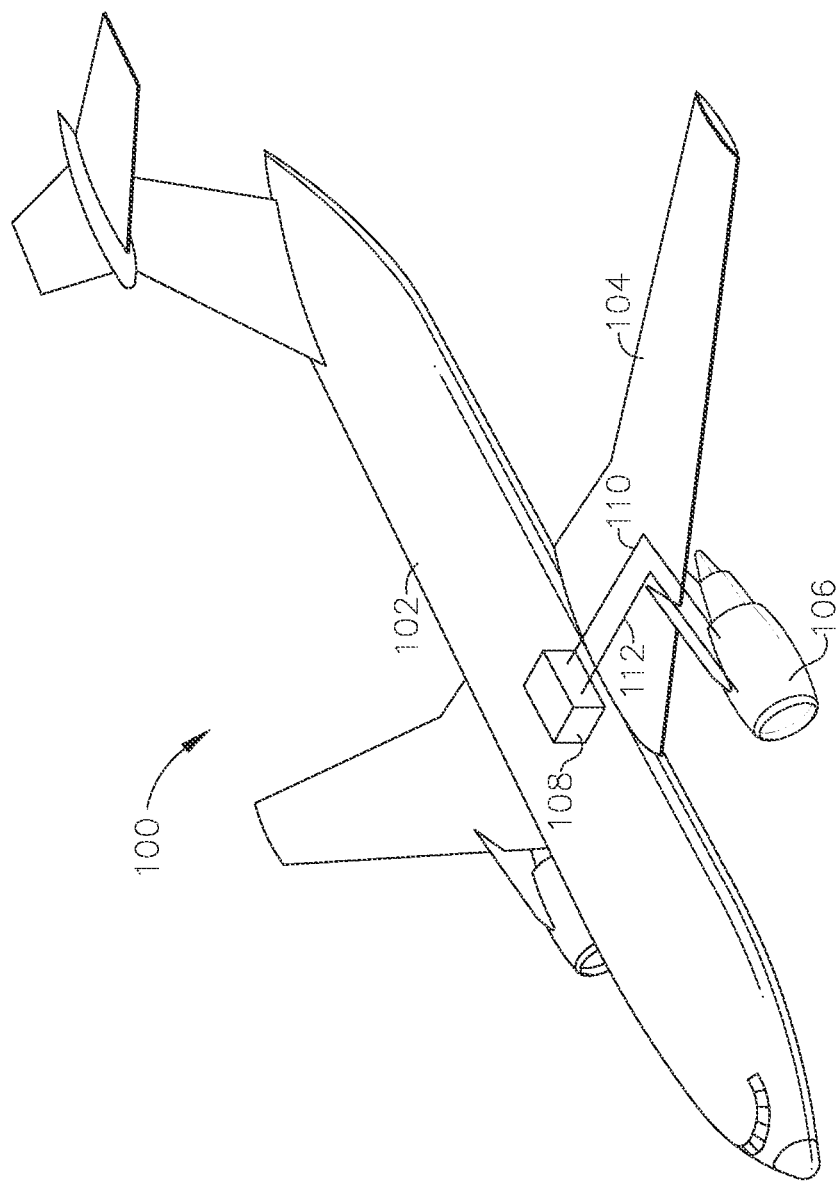
FIG. 2 is a perspective view of an aircraft including a fuselage and a wing.

FIG. 2 is a perspective view of an aircraft 100 including a fuselage 102 and a wing 104. A gas turbine engine 106 is coupled to wing 104 and is configured to supply propulsive power to aircraft 100 and may be a source of auxiliary power to various systems of aircraft 100. For example, gas turbine engine 106 may supply electrical power and pressurized air to the various systems. In one example, gas turbine engine 106 supplies pressurized air to an aircraft air management system (AMS) 108. In various embodiments, gas turbine engine 106 supplies a relatively higher pressure air through a first high-pressure conduit 110 and relatively lower pressure air through a second low-pressure conduit 112. In other embodiments, the relatively higher pressure air, the relatively lower pressure air, and a combination of the relatively higher pressure air and the relatively lower pressure air is generated proximate gas turbine engine 106 and channeled to AMS 108 through a single conduit, for example, first high-pressure conduit 110 or second low-pressure conduit 112.

Figure 3:
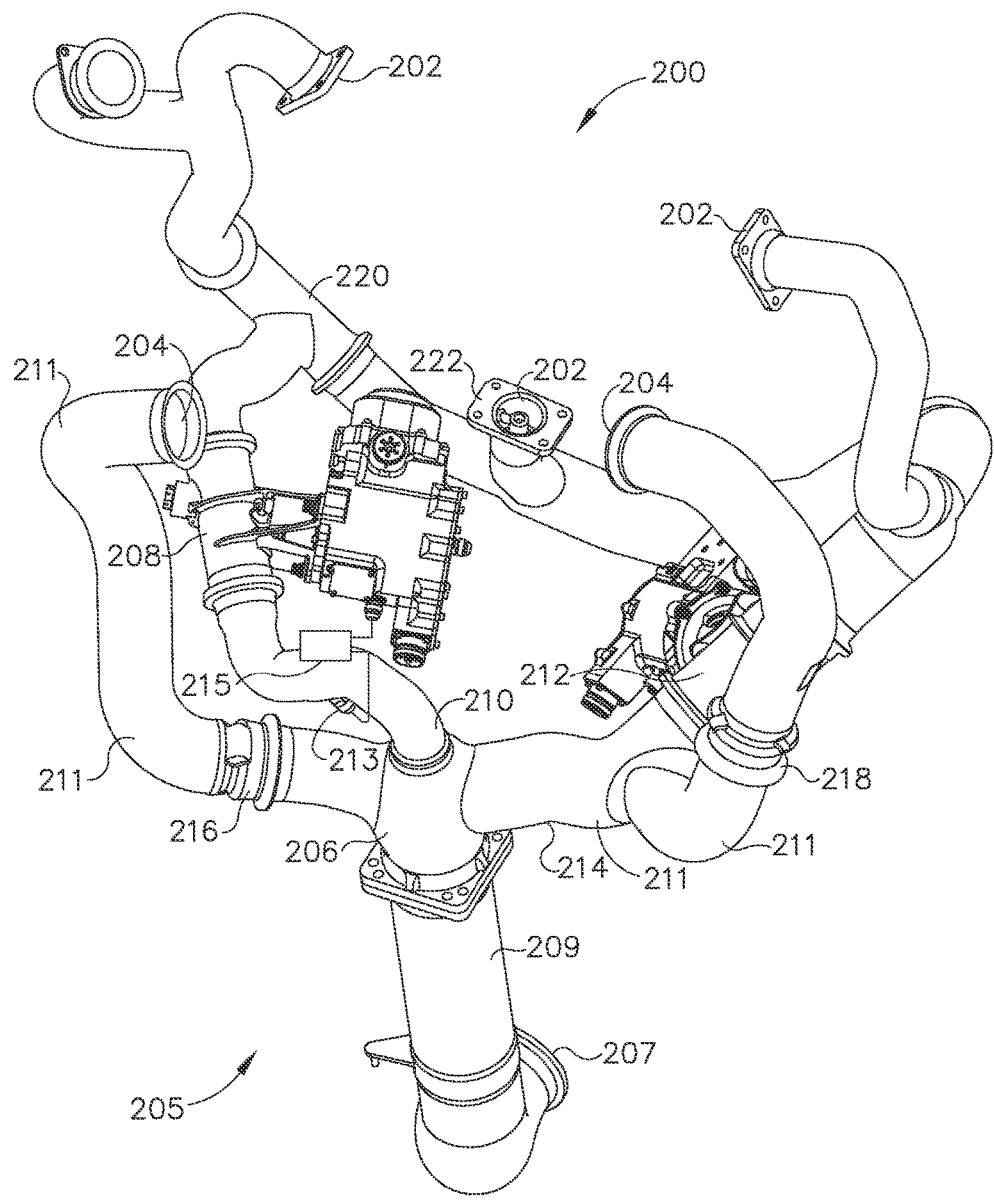
FIG. 3 is a three dimensional (3D) isometric piping view of an aircraft air management system (AMS) supply source.

FIG. 3 is a three dimensional (3D) isometric piping view of an aircraft air management system (AMS) supply source 200. AMS supply source 200 includes a high-pressure (HP) source, such as, but not limited to one or more compressor $10^{th}$ stage bleed ports 202, low-pressure (LP) source, such as, but not limited to one or more compressor $4^{th}$ stage bleed ports 204. Air from various combinations of ports 202 and 204 provide high-pressure, low-pressure, and mixed mode flows to a jet pump 205, which is supplied through a jet pump outlet 207 to a downstream AMS. Typically, the HP and LP flows are supplied directly from bleed ports 202 and 204 from a respective engine. A mixed mode bleed is supplied through a jet pump 205. Jet pump 205 receives both HP and LP air flow, mixes the flows in selectable proportions in a pre-mixing bowl 206 and delivers the mixed mode bleed air to the AMS through a mixing tube 209. Upstream duct bends 211 promote a non-uniform flow field between the multiple inlets, promoting swirl in the low-pressure flows without the use of swirl vanes.

A jet pump shutoff valve (JPSOV) 208 modulates to supply high-pressure air to a throat 210 of jet pump 205. A pressure sensor 213 between JPSOV 208 and throat 210 provides pressure feedback to control a position of JPSOV 208 to provide substantially constant selected pressure to throat. A controller 215 may be communicatively coupled to JPSOV 208 and pressure sensor 213. Controller 215 may include a memory and a processor in communication so that instructions programmed in the memory control the processor to receive a pressure signal from pressure sensor 213 and a threshold value to generate a position command, which is transmitted to JPSOV 208. A high-pressure shutoff valve (HPSOV) 212 opens and closes to supply high-pressure air from $10^{th}$ stage ports 202 to a first inlet 214. Check valves 216 and 218 prevent back flow from $10^{th}$ stage ports 202 to $4^{th}$ stage bleed ports 204.

AMS supply source 200 operates in three modes where outlet 207 is supplied from low-pressure $4^{th}$ stage bleed ports 204, from high-pressure bleed ports 202, and a mixed supply from both low-pressure $4^{th}$ stage bleed ports 204 and high-pressure bleed ports 202. In a first mode, outlet 207 is supplied from low-pressure $4^{th}$ stage bleed ports 204 with both JPSOV 208 and HPSOV 212 in a closed position. In a second mode, outlet 207 is supplied from high-pressure bleed ports 202 with JPSOV 208 in a closed position and HPSOV 212 in an open position. A third mode is a jet pump mode where HPSOV 212 is in a closed position and JPSOV 208 is in an open position. When in the open position, JPSOV 208 modulates to adjust flow from a single leg of the high-pressure supply portion 220 of AMS supply source 200.

A flow sensor 222 is configured to measure an amount of the extracted flow from the $10^{th}$ stage that is directed to AMS supply source 200. The $10^{th}$ stage bleed measurement is used to maintain the engine operation according to a predetermined air management schedule. Bleeding air from the $10^{th}$ stage may affect other stages of the engine. A map of a range of $10^{th}$ stage flow rates is used to determine an impact for the various flow rates on the engine. The $10^{th}$ stage bleed flow rate is accounted for in thrust schemes and fielding schemes that affect the engine performance.

Figure 4:
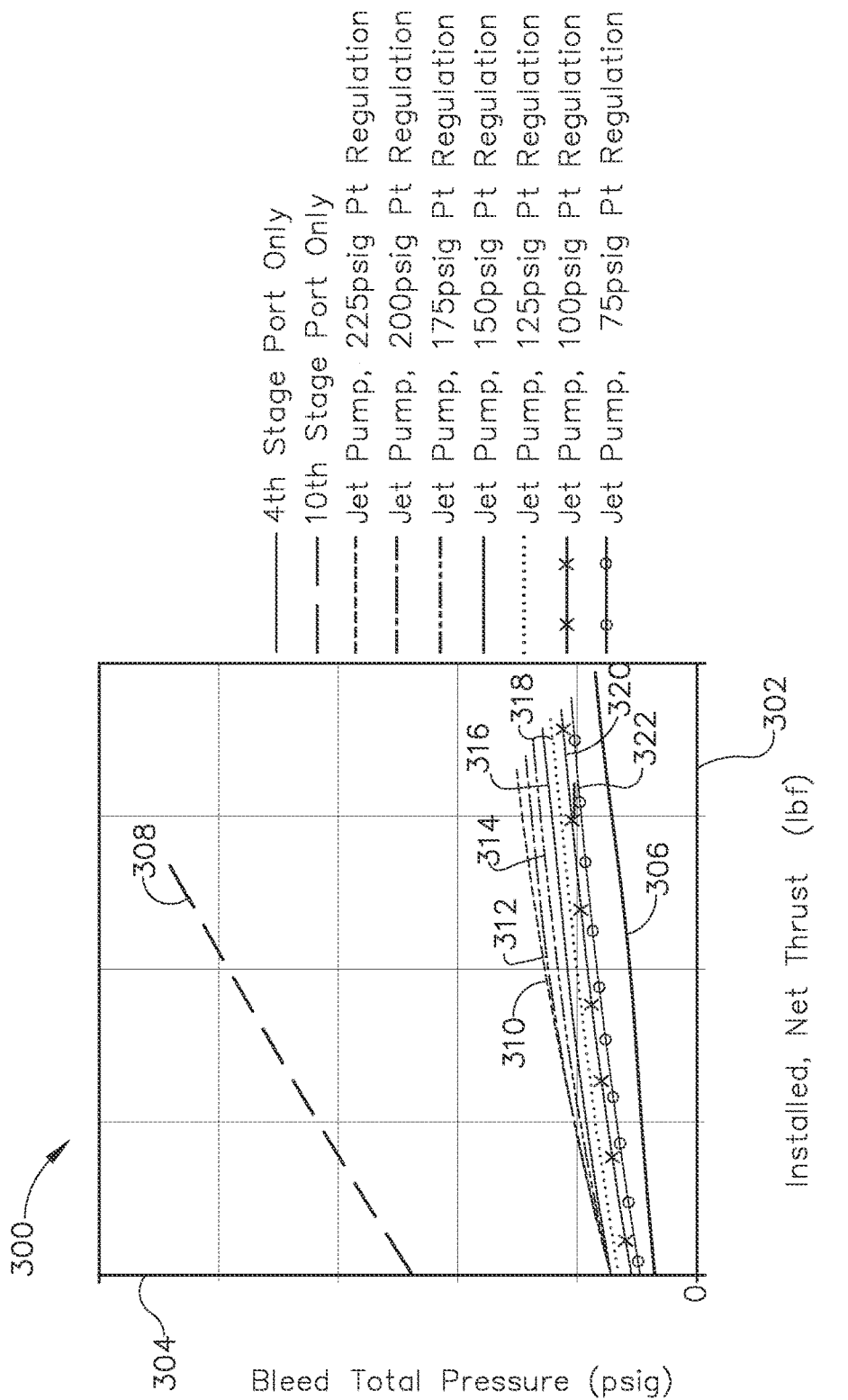
FIG. 4 is a graph of engine bleed pressure at various engine power settings.

FIG. 4 is a graph 300 of engine bleed pressure at various engine power settings. Graph 300 includes an x-axis 302 graduated in units of net thrust of engine (lbf) 106 and a y-axis 304 graduated in units of bleed total pressure (psig). A trace 306 illustrates a lower stage pressure, such as a fourth stage pressure of engine 106. A trace 308 illustrates an upper stage pressure, such as a tenth stage pressure of engine 106. Traces 306 and 308 represent the bounds of supply pressure to jet pump 205. A trace 310 illustrates a thrust versus bleed pressure curve for jet pump operation regulated to maintain approximately 225 psig pressure at throat 210 of jet pump 205. A trace 312 illustrates a thrust versus bleed pressure curve for jet pump operation regulated to maintain approximately 200 psig pressure at throat 210. A trace 314 illustrates a thrust versus bleed pressure curve for jet pump operation regulated to maintain approximately 175 psig pressure at throat 210. A trace 316 illustrates a thrust versus bleed pressure curve for jet pump operation regulated to maintain approximately 150 psig pressure at throat 210. A trace 318 illustrates a thrust versus bleed pressure curve for jet pump operation regulated to maintain approximately 125 psig pressure at throat 210. A trace 320 illustrates a thrust versus bleed pressure curve for jet pump operation regulated to maintain approximately 100 psig pressure at throat 210. A trace 322 illustrates a thrust versus bleed pressure curve for jet pump operation regulated to maintain approximately 75 psig pressure at throat 210.

Figure 5:
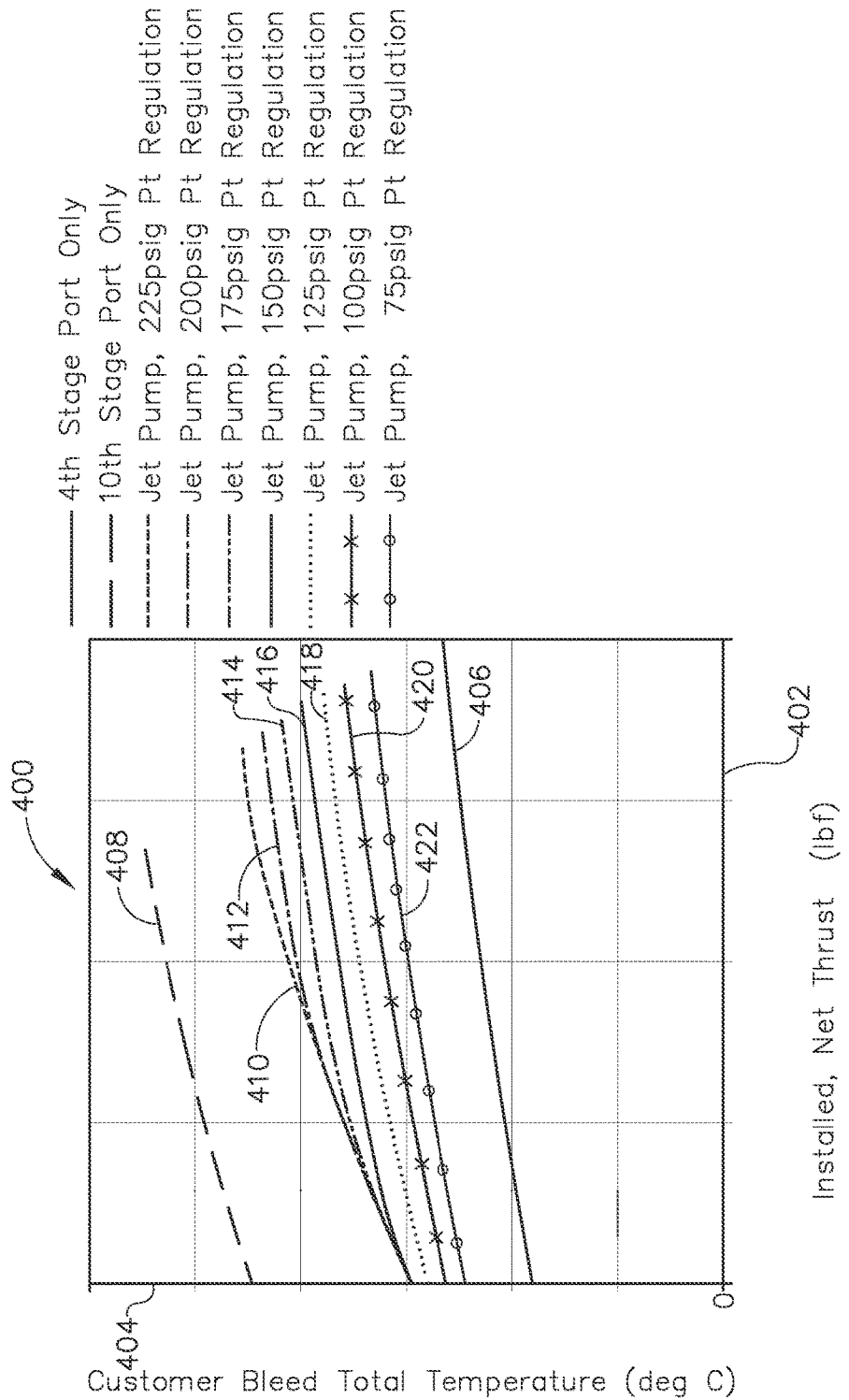
FIG. 5 is a graph of engine bleed temperature at various engine power settings.

FIG. 5 is a graph 400 of engine bleed temperature at various engine power settings. Graph 400 includes an x-axis 402 graduated in units of net thrust of engine (lbf) 106 and a y-axis 404 graduated in units of bleed total temperature (° C.). A trace 406 illustrates a lower stage temperature, such as a fourth stage temperature of engine 106. A trace 408 illustrates an upper stage temperature, such as a tenth stage temperature of engine 106. Traces 406 and 408 represent the bounds of supply temperature to jet pump 205. A trace 410 illustrates a thrust versus bleed temperature curve for jet pump operation regulated to maintain approximately 225 psig pressure at throat 210 of jet pump 205. A trace 412 illustrates a thrust versus bleed temperature curve for jet pump operation regulated to maintain approximately 200 psig pressure at throat 210. A trace 414 illustrates a thrust versus bleed temperature curve for jet pump operation regulated to maintain approximately 175 psig pressure at throat 210. A trace 416 illustrates a thrust versus bleed temperature curve for jet pump operation regulated to maintain approximately 150 psig pressure at throat 210. A trace 418 illustrates a thrust versus bleed temperature curve for jet pump operation regulated to maintain approximately 125 psig pressure at throat 210. A trace 420 illustrates a thrust versus bleed temperature curve for jet pump operation regulated to maintain approximately 100 psig pressure at throat 210. A trace 422 illustrates a thrust versus bleed temperature curve for jet pump operation regulated to maintain approximately 75 psig pressure at throat 210.

Figure 6:
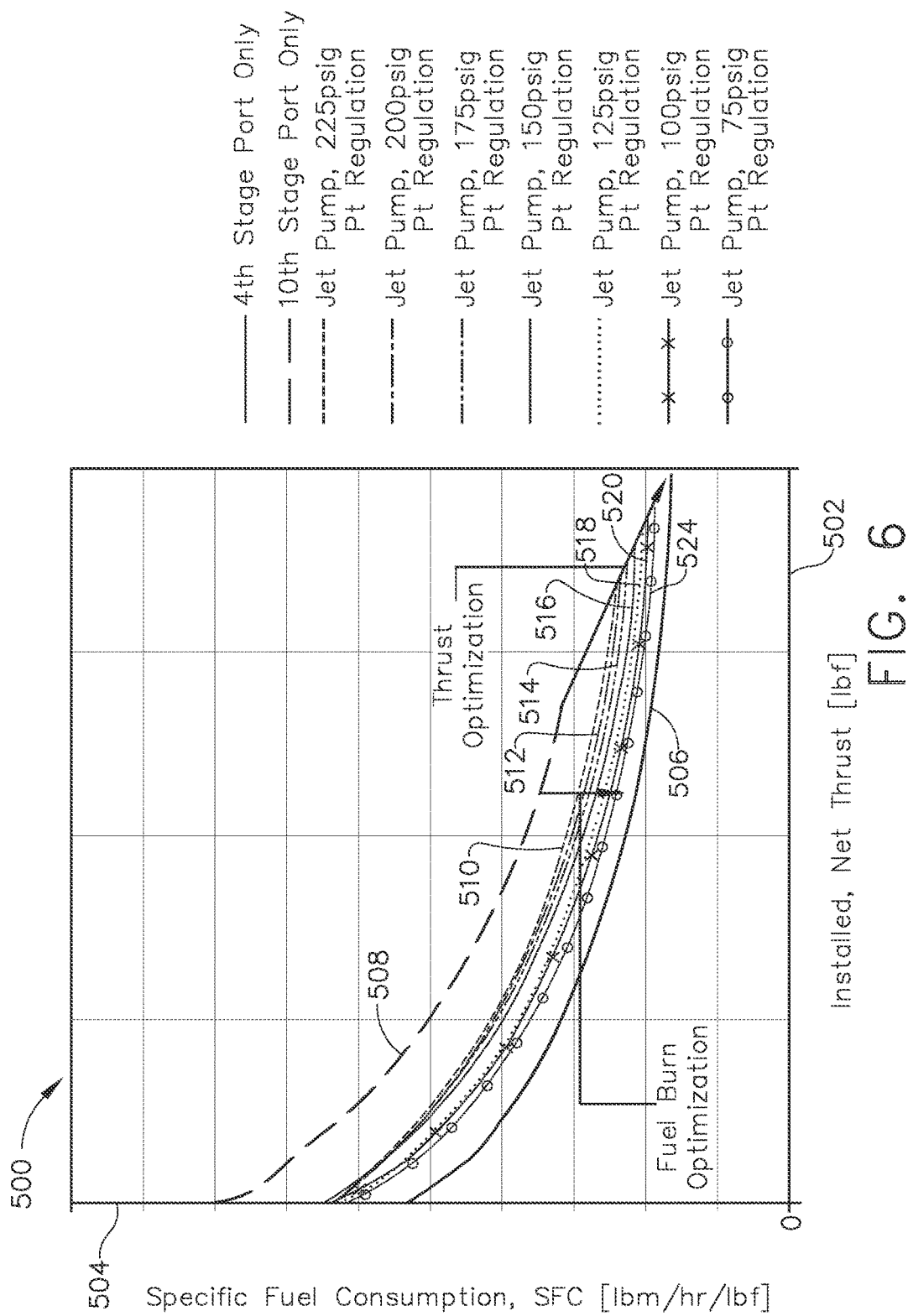
FIG. 6 is a graph of engine specific fuel consumption (SFC) at various engine power settings.

FIG. 6 is a graph 500 of engine specific fuel consumption (SFC) at various engine power settings. Graph 500 includes an x-axis 502 graduated in units of net thrust of engine (lbf) 106 and a y-axis 504 graduated in units of specific fuel consumption (SFC) (lbm/hr/lbf). A trace 506 illustrates an engine SFC curve versus engine net thrust when using only a lower compressor stage air for AMS 108, such as a fourth stage of compressor 12 of engine 106. A trace 508 illustrates an engine SFC curve versus engine net thrust when using only an upper compressor stage air for AMS 108, such as a tenth stage of compressor 12. Traces 506 and 508 represent the bounds of SFC of engine 106 based on AMS demand. A trace 510 illustrates a thrust versus SFC curve for jet pump operation regulated to maintain approximately 225 psig pressure at throat 210 of jet pump 205. A trace 512 illustrates a thrust versus SFC curve for jet pump operation regulated to maintain approximately 200 psig pressure at throat 210. A trace 514 illustrates a thrust versus SFC curve for jet pump operation regulated to maintain approximately 175 psig pressure at throat 210. A trace 516 illustrates a thrust versus SFC curve for jet pump operation regulated to maintain approximately 150 psig pressure at throat 210. A trace 518 illustrates a thrust versus SFC curve for jet pump operation regulated to maintain approximately 125 psig pressure at throat 210. A trace 520 illustrates a thrust versus SFC curve for jet pump operation regulated to maintain approximately 100 psig pressure at throat 210. A trace 522 illustrates a thrust versus SFC curve for jet pump operation regulated to maintain approximately 75 psig pressure at throat 210.

Traces 506-522 illustrate the benefit of jet pump 205 for improving SFC during operations that demand an output greater than that which only the fourth stage can provide but, that does not demand as much AMS output as the tenth stage can provide. These intermediate ranges are supplied by using tenth stage air to provide motive air to jet pump 205 while the fourth stage supplies air to the suction of jet pump 205.

It can be seen that using different levels of intermediate air pressures from jet pump 205, a SFC can be selected, which can aid engine 106 overall performance or performance during particular maneuvers.

Figure 7:
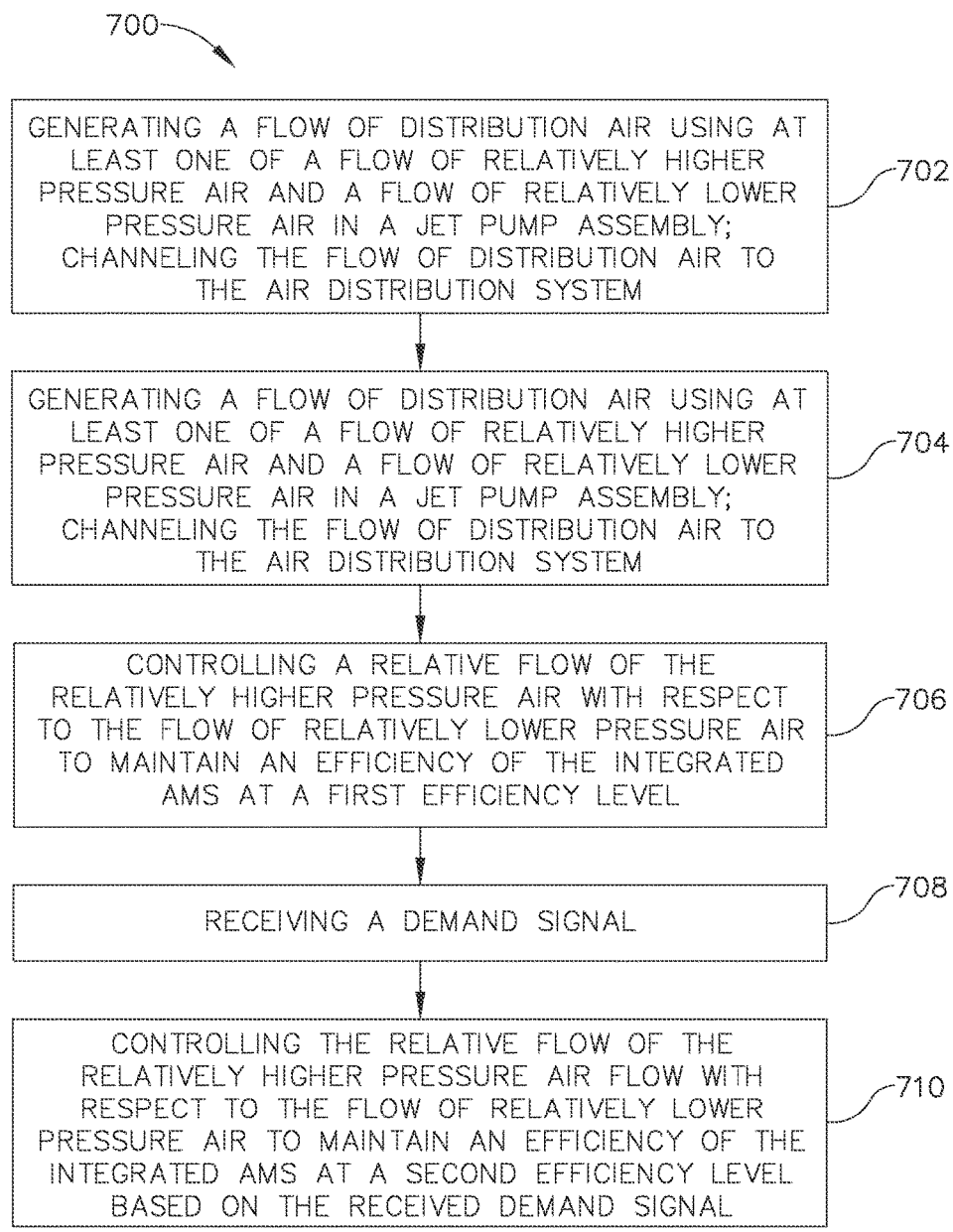
FIG. 7 is a flow chart of a method of operating an integrated air management system (AMS) that includes a supply system coupled to a compressor of a gas turbine engine and an air distribution system.

FIG. 7 is a flow chart of a method 700 of operating an integrated air management system (AMS) that includes a supply system coupled to a compressor of a gas turbine engine and an air distribution system. In the example embodiment, method 700 includes generating 702 a flow of distribution air using at least one of a flow of relatively higher pressure air and a flow of relatively lower pressure air in a jet pump assembly, channeling 704 the flow of distribution air to the air distribution system, and controlling 706 a relative flow of the relatively higher pressure air with respect to the flow of relatively lower pressure air to maintain an efficiency of the integrated AMS at a first efficiency level. Method 700 also includes receiving 708 a demand signal and controlling 710 the relative flow of the relatively higher pressure air flow with respect to the flow of relatively lower pressure air to maintain an efficiency of the integrated AMS at a second efficiency level based on the received demand signal.

Method 700 optionally includes controlling the relative flow of the relatively higher pressure air flow with respect to the flow of relatively lower pressure air to maintain a predetermined temperature of the distribution air. Method

700 may also include generating a flow of distribution air using one of a first operating mode, a second operating mode, and a third operating mode, the first operating mode generates the flow of distribution air using the flow of relatively lower pressure air in the jet pump assembly, the second operating mode generates the flow of distribution air using the flow of relatively higher pressure air in the jet pump assembly, and the third operating mode generates the flow of distribution air using a mixed flow of relatively lower pressure air and of relatively higher pressure air. Additionally, method 700 may further include channeling the flow of relatively higher pressure air from a high pressure bleed port of the compressor to a suction inlet of the jet pump assembly. Optionally, method 700 may include modulating the flow of relatively higher pressure air using a modulating valve coupled between the high pressure bleed port of the compressor and a supply inlet of the jet pump assembly. Further, method 700 may include modulating the flow of relatively higher pressure air based on a pressure feedback from a pressure sensor positioned between the modulating valve and the supply inlet of the jet pump assembly. Method 700 may also include channeling the flow of relatively higher pressure air from at least one high pressure bleed port of the compressor to a supply inlet of the jet pump assembly and channeling the flow of relatively lower pressure air from at least one low pressure bleed port of the compressor to at least one suction inlet of the jet pump assembly. Optionally, method 700 may also include channeling the flow of relatively lower pressure air to a first suction inlet of the jet pump assembly and to a second suction inlet of the jet pump assembly, an opening of the first suction inlet of the jet pump assembly including a first area, an opening of the second suction inlet of the jet pump assembly including a second area, the first area being larger than the second area. Method 700 may also include channeling the flow of relatively lower pressure air to a first suction inlet of the jet pump assembly and to a second suction inlet of the jet pump assembly, the flow of relatively lower pressure air to first suction inlet of the jet pump assembly including a first velocity, the flow of relatively lower pressure air to the second suction inlet of the jet pump assembly including a second velocity, the first velocity being less than the second velocity.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An aircraft air management system (AMS) comprising:
   a first pressurized fluid source of relatively higher pressure air;
   a second pressurized fluid source of relatively lower pressure air than the first pressurized fluid source; and
   a jet pump assembly comprising a motive air inlet, a plurality of suction inlets, and a single outlet;
   a supply source comprising:
   a first conduit configured to channel the relatively higher pressure air through a jet pump shutoff valve (JPSOV) to the motive air inlet;
   a second conduit configured to channel the relatively higher pressure air to at least one of the plurality of suction inlets through a high-pressure shutoff valve (HPSOV); and
   a third conduit configured to channel the relatively lower pressure air to at least one of the plurality of suction inlets;
   an outlet channeling outlet air from said jet pump assembly to a downstream AMS; and
   a controller configured to receive a pressure feedback signal from a pressure sensor positioned downstream of the JPSOV, said controller configured to maintain a predetermined pressure in said conduit.

2. The AMS of claim 1, further comprising a pressure sensor positioned in the first conduit between the first pressurized fluid source and the motive air inlet and downstream of the JPSOV, said pressure sensor configured to generate a pressure feedback signal.

3. The AMS of claim 2, further comprising a controller communicatively coupled to said pressure sensor and the JPSOV, said controller configured to generate a control signal that maintains a pressure at the motive air inlet constant.

4. The AMS of claim 1, further comprising a controller configured to receive a flow signal from a flow sensor configured to determine an amount of flow of relatively higher pressure air admitted into the AMS.

5. The AMS of claim 1, further comprising a controller configured to:
   receive an indication of at least one of a pressure, a temperature, and a flow of the relatively higher pressure air;
   receive an indication of at least one of a pressure, a temperature, and a flow of the relatively lower pressure air;
   determine an efficiency of the AMS using the received indications;
   receive a demand signal from at least one of an engine associated with the aircraft and the aircraft associated with the AMS; and
   modify the efficiency in response to the received demand signal.

6. A method of operating an integrated air management system (AMS) comprising:
   a first pressurized fluid source of relatively higher pressure air;
   a second pressurized fluid source of relatively lower pressure air than the first pressurized fluid source; and
   a jet pump assembly comprising a motive air inlet, a plurality of suction inlets, and a single outlet;
   a supply source comprising:
   a first conduit configured to channel the relatively higher pressure air through a jet pump shutoff valve (JPSOV) to the motive air inlet;
   a second conduit configured to channel the relatively higher pressure air to at least one of the plurality of suction inlets through a high-pressure shutoff valve (HPSOV); and
   a third conduit configured to channel the relatively lower pressure air to at least one of the plurality of suction inlets; and an outlet channeling outlet air from said jet pump assembly to a downstream AMS, said method comprising:

generating a flow of distribution air using at least one of a flow of relatively higher pressure air and a flow of relatively lower pressure air;

channeling the flow of distribution air to the supply source;

controlling a relative flow of the relatively higher pressure air with respect to the flow of relatively lower pressure air to maintain an efficiency of the integrated AMS at a first efficiency level using the JPSOV and HPSOV;

receiving a demand signal; and controlling the relative flow of the relatively higher pressure air flow with respect to the flow of relatively lower pressure air to maintain an efficiency of the integrated AMS at a second efficiency level using the JPSOV and HPSOV based on the received demand signal.

7. The method of claim 6, further comprising controlling the relative flow of the relatively higher pressure air flow with respect to the flow of relatively lower pressure air to maintain a predetermined temperature of distribution air.

8. The method of claim 6, wherein generating a flow of distribution air using at least one of a flow of relatively higher pressure air and a flow of relatively lower pressure air in a jet pump assembly comprises generating a flow of distribution air using one of a first operating mode, a second operating mode, and a third operating mode, the first operating mode generates the flow of distribution air using the flow of relatively lower pressure air in the jet pump assembly, the second operating mode generates the flow of distribution air using the flow of relatively higher pressure air in the jet pump assembly, and the third operating mode generates the flow of distribution air using a mixed flow of relatively lower pressure air and of relatively higher pressure air.

9. The method of claim 8, further comprising channeling the flow of relatively higher pressure air from a high pressure source to a suction inlet of the jet pump assembly.

10. The method of claim 8, further comprising modulating the flow of relatively higher pressure air using the JPSOV coupled between the high pressure source and a supply inlet of the jet pump assembly.

11. The method of claim 10, wherein modulating the flow of relatively higher pressure air comprises modulating the flow of relatively higher pressure air based on a pressure feedback from a pressure sensor positioned between the JPSOV and the supply inlet of the jet pump assembly.

12. The method of claim 6, further comprising:

channeling the flow of relatively higher pressure air to a supply inlet of the jet pump assembly; and channeling the flow of relatively lower pressure air to at least one suction inlet of the jet pump assembly.

13. An aircraft having a fuselage, a wing, a gas turbine engine, and an air management system (AMS), said AMS comprising:

a first pressurized fluid source of relatively higher pressure air;

a second pressurized fluid source of relatively lower pressure air than the first pressurized fluid source; and a jet pump assembly comprising a motive air inlet, a plurality of suction inlets, and a single outlet;

a supply source comprising:

a first conduit configured to channel the relatively higher pressure air through a jet pump shutoff valve (JPSOV) to the motive air inlet;

a second conduit configured to channel the relatively higher pressure air to at least one of the plurality of suction inlets through a high-pressure shutoff valve (HPSOV); and a third conduit configured to channel the relatively lower pressure air to at least one of the plurality of suction inlets;

an outlet channeling outlet air from said jet pump assembly to a downstream AMS; and a controller communicatively coupled to a pressure sensor and said JPSOV, said controller configured to generate a control signal that maintains a pressure at the motive air inlet constant.

14. The aircraft of Claim 13, wherein said controller is configured to match an output of said jet pump assembly to a demand for air of said aircraft using said plurality of controlled operation valves to permit a reduced size aircraft air pre-cooler.

* * * * *